Figure 4:
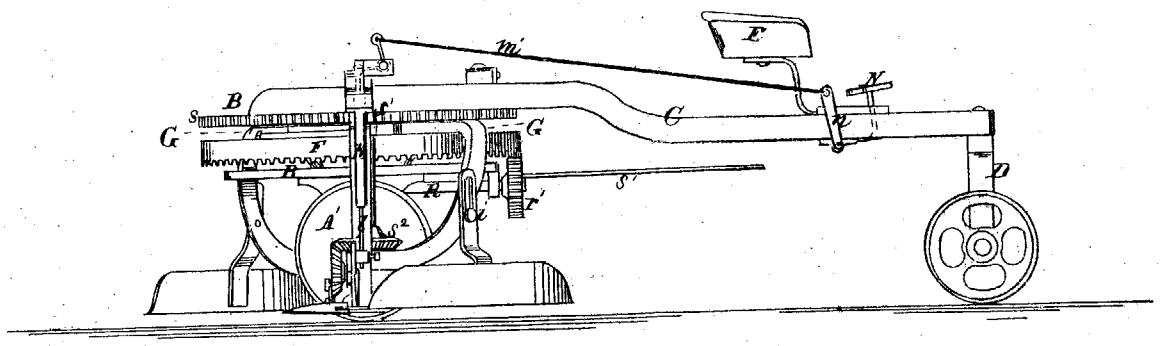

2 Sheets, Sheet 1
R. M. Williams,
Mower.
No. 3958. Reissued May 3 1870.
Fig. 2.
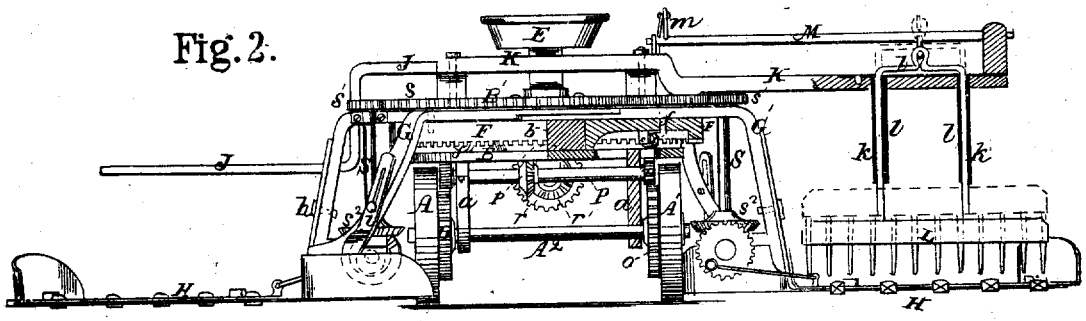
Fig. 1.
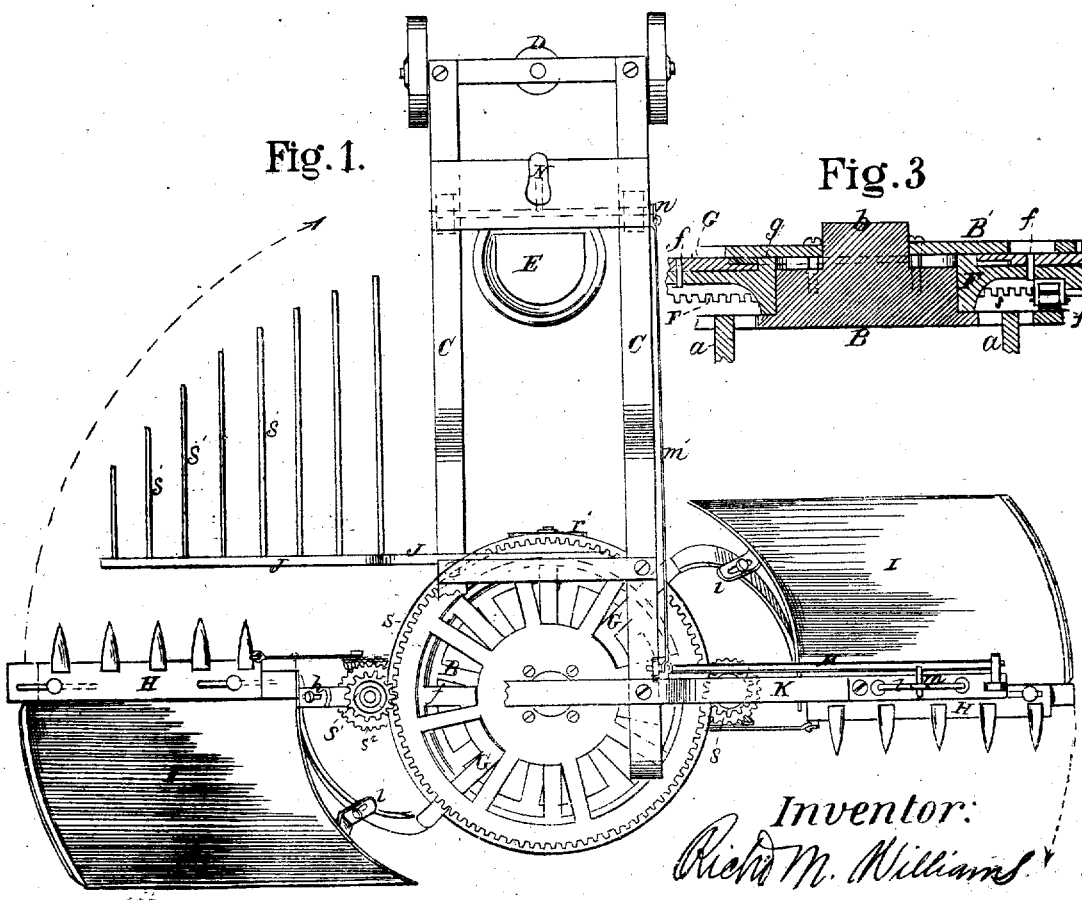
Fig. 3
Inventor:
Richd M. Williams
Witnesses:
Fred. Artos,
Wm. H. Rowe 2 Sheets, Sheet 2.

R. M. Williams,
Mower.

No. 3958. Reissued May 3. 1870.

Witnesses:
Fred. Artos
Wm. H. Rowe,

Inventor:
Robert M. Williams

United States Patent Office.

RICHARD MORTIMER WILLIAMS, OF ROCKVILLE, MARYLAND.

*Letters Patent No.* 95,864, *dated October* 12, 1869; *reissue No.* 3,958, *dated May* 3, 1870.

IMPROVEMENT IN HARVESTERS.

The Schedule referred to in these Letters Patent and making part of the same.

*To all whom it may concern:*

Be it known that I, RICHARD MORTIMER WILLIAMS, of Rockville, in the county of Montgomery and State of Maryland, have invented certain new and useful Improvements in Harvesters, of which the following is a full, clear, and exact description.

The object of my invention is to embody, in an effectively-working organized harvesting-machine, a principle which I have discovered of cutting grain by means of reciprocating cutters, cutting in a cycloidal path, by which I believe valuable results will be obtained.

To carry out the objects of my invention, I cause the cutting apparatus to revolve in a horizontal path in the arc of a circle.

The first part of my invention relates to the frame of the machine.

Its object is to secure a strong, light, and simple frame adapted to my improved system of cutting; and My improvement consists—

First, in constructing the frame, which supports the gearing of two fixed horizontal circular rings or plates, connected at their centers only, arranged parallel to each other, with a space between for a rotating gear-wheel. The driving-wheels and gearing are connected with the lower plate, while the rake and driver's seat are connected with the upper one.

Second, my invention further consists in combining, with the frame above described, laterally-projecting arms to support a gathering-rake and a stop-rake, and a long, high frame or perch projecting in front thereof, supported by a leading-truck, and carrying a seat for the driver.

The next part of my invention relates to the gearing; and

My improvement consists—

Third, in combining, in a harvester, a fixed horizontal gear-ring, a crown-wheel, revolving on a vertical axis concentric with said ring, and gearing for driving the cutters carried by the revolving ring, but rotated by the fixed ring, thus constituting an improved planetary gear for harvesters.

The next part of my invention relates to the cutting apparatus; and

The improvement consists-

Fourth, in a reciprocating cutter, so combined with a harvester as to rotate around said machine in a circular horizontal path, which movement, combined with the forward movement of the machine, causes the cutting apparatus to traverse in a cycloidal path, and to cut a swath wider than the length of the finger-beam.

Fifth, my improvement further consists in combining a reciprocating cutter projecting laterally beyond the driving-wheels and rotating in a circular path, with a platform revolving with the finger-beam.

Sixth, my improvement further consists in combining a fixed gear-ring, a revolving crown-wheel, and a cutting apparatus, supported by coupling-arms pivoted to the common center of the gear-ring and crown-wheel, and connected with the latter by a frangible connection, so that, in case the cutting apparatus strikes an obstruction, the connection between the coupling-arms and the crown-wheel breaks, and thus allows the cutting apparatus to yield, to avoid breakage.

Seventh, my improvement further consists in combining with a reciprocating cutter, projecting laterally beyond the driving-wheels, and rotating around them in a circular path, fixed gathering-teeth arranged above the cutting apparatus and parallel with the path of the machine, to sustain the stalks against the lateral pressure of the cutters.

Eighth, my improvement further consists in combining a cutting apparatus, rotating around the driving-wheels, with a fixed laterally projecting gathering-rake on the grain side thereof, and a discharge-rake on the stubble side, so that the grain is cut and gathered on one side, carried round and discharged upon the ground on the other.

Ninth, my improvement further consists in combining a cutting apparatus and platform rotating around the driving-wheels, with a stop or discharge-rake vibrated by the driver to regulate the size of the gavels.

In the accompanying drawings which make part of this specification—

Figure 1 represents a plan or top view of so much of a harvesting-machine, embodying all the improvements herein claimed, as is necessary to illustrate my invention, with part of the frame-work broken away to show the other parts more clearly.

Figure 2, a view, partly in section and partly in elevation, of the same, as seen from behind.

Figure 3, a vertical transverse section through the main frame and gearing, at the line of the main axle.

Figure 4, a view, in elevation, of the same, as seen from the stubble side thereof.

Two driving-wheels, A $A^1$, revolve loosely on an axle, $A^2$, which is mounted in brackets, *a*, extending beneath a circular plate or ring, B, forming the lower path of the frame or bed-plate of the machine.

A spindle or hub, *b*, extends upward from the center of this plate, and supports another fixed ring, B′, parallel with, but some distance above the other.

A perch or supporting-frame, C, is secured to this upper plate B′, and extends in front thereof, its forward end being supported by a swiveling leading-truck, D, of well-known construction, to permit the machine to be turned in a small space.

A seat, E, for the driver, is mounted on this connecting-frame or perch.

A crown-wheel, F, is arranged to turn freely upon the spindle *b*.

Arms G G′ rest upon and turn freely on the hub *g* of the wheel F, (see fig. 3,) to which wheel they are connected by transverse wooden pins *f*, for a purpose hereinafter explained.

Friction-rollers, *f′*, on the crown-wheel run on the bed-plate B.

The arms G G′ project beyond the periphery of the crown-wheel, and are bent so as to form down-hangers, pendent brackets, or coupling-arms.

A cutting apparatus, of the well-known construction patented by Obed Hussey August 7, 1847, is secured to a finger-beam, H, fastened at its inner or heel end to the down-hanger G, by a slot and set-screw *h*, to permit it to be adjusted higher or lower, as required.

A platform, I, is attached to the finger-beam, and is also connected with the coupling-frame G′ by a slot and set-screw, *i*, to permit it to be adjusted correspondingly with the finger-beam. The cutting apparatus and platform project laterally beyond the driving-wheels. The drawings show two cutting apparatus. I have described but one, however, as both are constructed alike.

An arm, J, projecting laterally beyond the frame on its grain-side, is provided with fingers or rake-teeth, *j*, arranged parallel with each other and with the line of draft of the machine. These teeth enter the standing grain and support the stalks against the lateral thrust of the cutting apparatus. The teeth are graded or made of different lengths, as shown in fig. 1, the shortest ones being on the grain-side, and gradually increasing in length toward the inner side to correspond with the path described by the cutters.

An arm, K, projects laterally from the stubble-side of the main frame, and supports a rake, L, by means of a yoke, *l*, which passes up through sleeves, *k*, on the arm, and moves freely endwise therein. The rake can be set higher or lower on the yoke by means of set-screws in blocks through which the rakes pass, as shown in fig. 4.

The upper end of the yoke is connected by an arm, *m*, with a rock-shaft, M, operated by a link-rod, *m′*, crank *n*, and treadle N, worked by the foot of the driver, to raise or lower the rake, to regulate the size of the gavels, as hereinafter explained.

Spur-wheels O, (running loosely on the main axle $A^2$, but connected with the driving-wheels by suitable backing-ratchets,) drive corresponding pinions, *p*, on a counter-shaft, P, carrying a bevel-pinion, *p′*, driving a corresponding pinion, *r*, on a shaft, R, carrying a spur-pinion, *r′*, on its forward end. This pinion drives the the crown-wheel F, and thus causes the cutting apparatus to rotate around the main frame.

As the cutting apparatus rotates, the teeth *s* of the fixed ring or frame rotate a spur-gear, *s′*, on a vertical shaft, S, mounted in the coupling-frame G, and carrying on its lower end a bevel-wheel, $s^2$, which drives the cutters by a crank and pitman in the usual way. The rotary movement of the cutters, it will be seen, is thus derived from the crown-wheel F, while their reciprocating movement is derived from the teeth *s* of the fixed ring B′.

The operation of my machine is as follows:

As the machine advances, the rake J enters the uncut grain, the cutters and platform revolve around the main frame, and cut the grain in its forward movement on the grain-side of the machine. The forward movement of the machine, combined with the rotary movement of the cutting apparatus, causes the latter to describe a cycloidal path, as shown by the dotted line *x* in fig. 1, instead of cutting in a straight line as heretofore, my machine cutting very much like the old hand-scythe.

One consequence of my improved mode of cutting is, that I am enabled to cut a swath wider than the length of the cutting apparatus, as the revolution of the cutting apparatus is more rapid than the forward movement of the machine.

The grain, as it is cut, falls upon the platform and is carried around to the stubble-side of the machine and discharged, being arrested by the stop-rake, while the platform moves from under it and allows it to drop upon the ground. A gavel is discharged by each platform at every revolution, unless the rake be lifted by the driver operating the treadle, in which case the gavel is again carried around, increased by the addition of the grain cut on its last round.

By my improvement, side draft is almost entirely obviated, as the line of draft is central with the machine. It is obvious that the machine may readily be adapted for use as a mower by removing the rake and platform.

I claim as my invention—

1. The main frame, constructed substantially as set forth, of two fixed horizontal rings arranged parallel to each other, with a space between them for a gear-wheel, and connected at their centers only.

2. The combination of the main frame, the fixed gathering-rake, the stop-rake, and the connecting-frame or perch on which the driver is mounted, all constructed for joint operation, substantially as set forth.

3. The combination of the fixed gear *s*, the rotating crown-wheel, and the gearing for driving the cutters, carried by the crown-wheel, but rotated from the fixed gear *s*, all these parts being constructed to operate in combination, as hereinbefore set forth.

4. The rotating reciprocating cutting apparatus, operating substantially in the manner described, so that it shall rotate around the main frame, and thus cut a swath wider than the length of the cutter, as set forth.

5. The combination of the reciprocating rotating cutting apparatus, and the platform revolving around the main frame with the cutting apparatus, as hereinbefore set forth.

6. The combination of the fixed gear *s*, the revolving crown-wheel, the cutting apparatus, and the coupling-arms connected with the revolving crown-wheel by a frangible connection, such as a wooden pin or its equivalent, as hereinbefore set forth, to prevent injury to the gearing.

7. The combination of the reciprocating rotating cutters with the fixed gathering rake on the grain-side of the main frame, these parts being constructed to operate in combination, substantially as set forth.

8. The combination, as set forth, of the reciprocating rotating cutters, the gathering-rake on the grain-side of the machine, and the discharging-rake on the stubble-side thereof.

9. The combination of the reciprocating rotating cutters, the rotating platform, and the discharge-rake, operated by the driver from his seat, these parts being constructed to operate in combination, substantially as set forth.

RICHARD MORTIMER WILLIAMS.

Witnesses:
BALTIS DE LONG,
WM. H. ROWE.